3,439,067
PHOSPHORUS-CONTAINING REACTION PRODUCT OF AN ACID OF PHOSPHORUS, TETRAHYDROFURAN AND AN ALKYLENE OXIDE

Arthur L. Austin and Robert J. Hartman, Southgate, and John T. Patton, Jr., Wyandotte, Mich., assignors to Wyandotte Chemicals Corporation, Wyandotte, Mich., a corporation of Michigan
No Drawing. Filed Dec. 10, 1965, Ser. No. 513,106
Int. Cl. C07f 9/02; C08g 51/50; C09k 3/28
U.S. Cl. 260—920
10 Claims

ABSTRACT OF THE DISCLOSURE

Phosphorus-containing products are prepared by the reaction of an acid of phosphorus having a $P_2O_5$ equivalency of from about 62% to 100% with tetrahydrofuran and, optionally, an alkylene oxide. These products are particularly useful in the preparation of polyurethane foams.

---

This invention relates to novel phosphorus-containing reaction products and to a process for the preparation thereof. More particularly, this invention relates to phosphorus-containing products prepared by the reaction of certain acids of phosphorus with tetrahydrofuran and, optionally, an alkylene oxide.

The preparation of polyurethane foams is well known in the art. One of the most important uses of these foams is in the building, insulation and construction industries. In these industries, it is desirable and often imperative that the polyurethane foam be non-burning or flame-retardant. A number of compounds have been incorporated into polyurethane foams, either during the preparation of the foam or after the foam is prepared to impart flame-retardant properties thereto. A preferential group of compounds, because of their efficacy, are phosphorus-containing compounds. In fact, this application provides for one of the most important uses of phosphorus-containing compounds in the chemical art today.

Now, in accordance with this invention, a new group of phosphorus-containing products is prepared which, when employed in the preparation of polyurethane foams, imparts flame-retardant properties thereto. The phosphorus-containing products of this invention are prepared by the reaction of tetrahydrofuran with certain acids of phosphorus. It is also within the purview of the invention to include an alkylene oxide in the reaction mixture. Thus, the products of this invention may be prepared from two or more reactants. It was surprising and unexpected that reaction products could be prepared from an acid of phosphorus and tetrahydrofuran since, heretofore, tetrahydrofuran has been considered an inert solvent for reactions of this type.

Acids of phosphorus which may be employed in the preparation of the products of this invention are those acids corresponding to a $P_2O_5$ equivalency of from about 62% to 100%. Thus, $P_2O_5$, commonly known as phosphorus pentoxide and phosphoric acid anhydride, although not generally defined as an acid of phosphorus, is included within those phosphorus compounds employable in the present invention. Other illustrative compounds include phosphoric acid, orthophosphoric acid, pyrophosphoric acid, polyphosphoric acid, metaphosphoric acid, certain partial esters of any of the above acids, and mixtures of any of the above acids and/or esters. It is essential that the acid employed have a $P_2O_5$ equivalency of at least 62% since acids having lower $P_2O_5$ equivalencies do not appear to react with tetrahydrofuran to any appreciable degree.

It is to be understood that the term "alkylene oxide" refers to those compounds containing an oxirane ring. Alkylene oxides which may be used in accordance with this invention include ethylene oxide, propylene oxide, the isomeric normal butylene oxides, hexylene oxide, octylene oxide, dodecene oxide, methoxy and other alkoxy propylene oxides, styrene oxide, cyclohexene oxide and the diglycidyl ether of Bisphenol A. Halogenated alkylene oxides may also be used, such as epichlorohydrin, epiiodohydrin, epibromohydrin, 3,3-dichloropropylene oxide, 3-chloro-1,2-epoxybutane, 1-chloro-2,3-epoxybutane, 3,4-dichloro-1,2-epoxybutane, 1,4-dichloro-2,3-epoxybutane, 1-chloro-2,3-epoxybutane, and 3,3,3-trichloropropylene oxide. Mixtures of any of the above alkylene oxides may also be employed. The process of this invention is particularly applicable to lower alkylene oxides containing from two to four carbon atoms and, more particularly, to propylene oxide.

The products of this invention may be prepared by adding an acid of phosphorus to tetrahydrofuran or by adding tetrahydrofuran to an acid of phosphorus. When acids having a high $P_2O_5$ equivalency are employed, it is preferred to add the acid to the tetrahydrofuran to avoid viscosity problems. When an alkylene oxide is employed, it is generally added to the reaction product of the acid and the tetrahydrofuran.

The reaction between an acid of phosphorus and tetrahydrofuran is exothermic and, therefore, proceeds readily on its own. However, if desired, heat may be applied or a catalyst may be employed. If a catalyst is employed, a Lewis acid catalyst such as boron trifluoride is preferred. In the situations where $P_2O_5$ is employed as the starting phosphorus compound, a catalyst is particularly preferred.

If the products of this invention are prepared from an acid of phosphorus, tetrahydrofuran and an alkylene oxide, the alkylene oxide will generally be added to the acid-tetrahydrofuran reaction mixture. This addition must be carefully controlled as the accompanying reaction is highly exothermic. Generally, the addition occurs at such a rate as to maintain a reaction temperature of from about 20° C. to about 150° C., preferably from about 50° C. to 100° C. It is also possible to add an alkylene oxide to tetrahydrofuran and thereafter to add the oxide-tetrahydrofuran mixture to an acid of phosphorus or to add an acid of phosphorus to an oxide-tetrahydrofuran mixture.

The reaction products of this invention, in addition to being useful in the preparation of polyurethane foams, also find utility as plasticizers for synthetic and natural resins or polymers, as additives for functional fluids, as a component of polyester resins and in some instances as surface active agents.

A more comprehensive understanding of the invention can be obtained by considering the following examples which are, however, not to be considered as being unduly limitative of the invention. The amounts of materials used in the examples are, in all instances, expressed in parts by weight.

EXAMPLE I

A reaction vessel equipped with stirrer, thermometer, addition funnel, reflux condenser and heat exchange means was charged with 154 parts of tetrahydrofuran.

Into the addition funnel was charged 129.2 parts of 115% phosphoric acid, also known as polyphosphoric acid ($P_2O_5$ equivalency of 83.2%). The acid was then added to the vessel over a period of five hours. After the addition was completed, the reaction mixture was refluxed for two hours. Unreacted tetrahydrofuran was stripped from the product at up to 150° C. A light yellow liquid product (203 parts) was obtained. The product was subjected to infrared analysis which indicated that tetrahydrofuran had reacted with the phosphoric acid.

EXAMPLE II

To a reaction vessel were charged 61.7 parts of tetrahydrofuran, 10 parts of phosphorus pentoxide and 2.5 parts of boron trifluoride. The reaction mixture was then heated to about 70° C. and a reaction occurred, as evidenced by the gel which formed. Upon standing, the reaction mixture became rather viscous. This reaction was also carried out without the boron trifluoride catalyst. The reaction proceeded slowly but did occur, as evidenced by the gel which formed.

EXAMPLE III

To a reaction vessel equipped as described in Example I is added 196 parts of 85% phosphoric acid ($P_2O_5$ equivalency of 62%). Tetrahydrofuran (72 parts) is added, with stirring, to the vessel through a funnel over a period of about fifteen minutes, during which time the temperature of the reaction mixture rose to about 80° C. The reaction mixture is heated to about 100° C., allowed to cool and then 937 parts of propylene oxide is added at a rate so as to maintain a temperature of between 50° C. and 70° C. The reaction product is stripped for two hours at 80° C. under about one to two millimeters of mercury. A light yellow liquid product (1120 parts) is obtained, characterized by a hydroxyl number of 385 and 10.5% phosphorus as $P_2O_5$.

EXAMPLE IV

To a reaction vessel equipped as described in Example I was added 196 parts of 100% phosphoric acid, also known as orthophosphoric acid ($P_2O_5$ equivalency of 72.4%). While stirring the acid, 72 parts of tetrahydrofuran was added to the vessel through a funnel over a period of fifteen minutes, during which time the temperature of the reaction mixture rose from 30° C. to about 80° C. The reaction mixture was heated to 100° C., allowed to cool, and then 272 parts of propylene oxide was added at a rate so as to maintain a temperature of between 50° C. and 60° C. The reaction product was stripped for two hours at 80° C. under about one to two millimeters of mercury. A liquid product (509 parts) was obtained. To 458 parts of the liquid product was added 480 parts of propylene oxide, again maintaining the temperature around 60° C. After the reaction was completed, the product was stripped for two hours at 80° C. under about one to two millimeters of mercury. A light yellow liquid product (813 parts) was obtained with the following properties: hydroxyl number, 346; acid number, 0.5; 15.3% phosphorus as $P_2O_5$.

EXAMPLE V

To a reaction vessel equipped as described in Example I was charged 216.5 parts of tetrahydrofuran. To the vessel, 133.5 parts of 115% phosphoric acid, also known as polyphosphoric acid ($P_2O_5$ equivalency of 83.2%), was added, through a funnel, over a period of three hours while stirring the charge. Then, over a period of about ten hours, 320.4 parts of propylene oxide was added. During the addition of the propylene oxide, the temperature was maintained at about 50° C. Stripping the product at 80° C. and under one to two millimeters of mercury yielded 562 parts of a light yellow liquid having the following properties: hydroxyl number, 260; acid number 0.75; 19.6% phosphorus as $P_2O_5$.

EXAMPLE VI (A) Example V is duplicated with the exception that 513 parts of epichlorohydrin is substituted for the 320.4 parts of propylene oxide. The product (725 parts), a light yellow liquid, is characterized by a hydroxyl number of 200 and 15.7% phosphorus as $P_2O_5$.

(B) Example V is duplicated with the exception that 507 parts of ethylene oxide is substituted for the 320.4 parts of propylene oxide. A light yellow product (720 parts) is obtained, characterized by a hydroxyl number of 200 and 15.8% phosphorus as $P_2O_5$.

(C) Example V is duplicated with the exception that 400 parts of 1,2-butylene oxide is substituted for the 320.4 parts of propylene oxide. A light yellow product (630 parts) is obtained, characterized by a hydroxyl number of 230 and 18.0% phosphorus at $P_2O_5$.

EXAMPLE VII

To a reaction vessel equipped as described in Example I was charged 72 parts of tetrahydrofuran and 304 parts of propylene oxide. Then, while stirring, 101 parts of 100% phosphoric acid, also known as orthophosphoric acid (72.4% $P_2O_5$ equivalency), was added to the charge over a period of three hours while maintaining the temperature at about 60° C. After the addition of the acid was completed, the reaction mixture was maintained at 70° C. for two hours. Stripping the product at 80° C. under one to two millimeters of mercury for two hours yielded 421 parts of a yellow liquid product with properties similar to those obtained in Example IV.

EXAMPLE VIII

A polyurethane foam was prepared from the product of Example V by mixing the following ingredients in the order listed. Standard procedure was followed in the preparation of the polyurethane foam.

| | Parts |
|---|---|
| Product of Example V | 24.4 |
| Mixture of 2,4- and 2,6-tolylene diisocyanate | 13.0 |
| Silicone surfactant | 0.3 |
| Halogenated hydrocarbon blowing agent | 5.0 |
| Dibutyltin dilaurate | 0.25 |

A white, rigid foam was obtained which exhibited excellent flame-retardant properties.

It is to be understood that various changes and modifications may be made in the foregoing without departing from the spirit of the invention and scope of the appended claims.

We claim:
1. A phosphorus-containing product prepared by the reaction at a temperature between 20° C. and 150° C. of an acid of phosphorus having a $P_2O_5$ equivalency of from about 62% to 100% with (a) tetrahydrofuran or (b) tetrahydrofuran and (1) an alkylene oxide or (2) a halogenated alkylene oxide.

2. A phosphorus-containing product prepared by the reaction at a temperature between 20° C. and 150° C. of an acid of phosphorus having a $P_2O_5$ equivalency of from about 62% to 100% with tetrahydrofuran.

3. The product of claim 2 when the acid of phosphorus is a phosphoric acid.

4. The product of claim 2 when the acid of phosphorus is phosphorus pentoxide.

5. A phosphorus-containing product prepared by the reaction at a temperature between 20° C. and 150° C. of (a) an acid of phosphorus having a $P_2O_5$ equivalency of from about 62% to 100%, (b) tetrahydrofuran and (c) an alkylene oxide or a halogenated alkylene oxide.

6. The product of claim 5 when the acid of phosphorus is a phosphoric acid.

7. The product of claim 5 when the acid of phosphorus is phosphorus pentoxide.

8. The product of claim 5 when the alkylene oxide is propylene oxide.

9. The product of claim 5 when the alkylene oxide is selected from the group consisting of ethylene oxide, butylene oxide and epichlorohydrin.

10. A process for the preparation of phosphorus-containing reaction products which comprises contacting at a temperature between 20° C. and 150° C. an acid of phosphorus having a $P_2O_5$ equavalency of from about 62% to 100% with (a) tetrahydrofuran or (b) tetrahydrofuran and (1) an alkylene oxide or (2) a halogenated alkylene oxide.

References Cited

UNITED STATES PATENTS 3,267,149   8/1965   Garner.

CHARLES B. PARKER, *Primary Examiner.*

A. H. SUTTO, *Assistant Examiner.*

U.S. Cl. X.R.

260—953, 978, 980, 2.5